United States Patent
Hiroe

(10) Patent No.: US 11,323,589 B2
(45) Date of Patent: May 3, 2022

(54) IMAGE PROCESSING APPARATUS AND IMAGE FORMING APPARATUS FOR SYNTHESIZING A READING DIRECTION IMAGE WITH IMAGE DATA GENERATED FROM A SCANNED SHEET TO DETERMINE READING DIRECTION OF A SHEET

(71) Applicant: TOSHIBA TEC KABUSHIKI KAISHA, Tokyo (JP)

(72) Inventor: Yoshihito Hiroe, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/202,689

(22) Filed: Mar. 16, 2021

(65) Prior Publication Data
US 2021/0409570 A1    Dec. 30, 2021

(30) Foreign Application Priority Data

Jun. 26, 2020    (JP) .............................. JP2020-110093

(51) Int. Cl.
*H04N 1/387*    (2006.01)
*H04N 1/00*     (2006.01)
*G06F 3/12*     (2006.01)

(52) U.S. Cl.
CPC ....... *H04N 1/3871* (2013.01); *H04N 1/00358* (2013.01); *H04N 1/00368* (2013.01); *H04N 1/3873* (2013.01)

(58) Field of Classification Search
CPC ............. H04N 1/3871; H04N 1/00358; H04N 1/00368; H04N 1/3873; G06K 9/18; G06K 9/2054; G06K 9/2063; G06K 2009/3225; G06K 5/04; G06F 3/1242; G06F 3/1243
USPC .......... 358/1.1, 1.9, 2.1, 1.11–1.18; 382/175, 382/180
See application file for complete search history.

(56) References Cited

U.S. PATENT DOCUMENTS

2009/0316163 A1*  12/2009  Hanawa ............... H04N 1/3871
                                                        358/1.6
2020/0177761 A1*   6/2020  Mizuno ............. H04N 1/00822

FOREIGN PATENT DOCUMENTS

| JP | H11254793   | A |   | 9/1999  |
|----|-------------|---|---|---------|
| JP | 2006303920  | A | * | 11/2006 |
| JP | 2006303920  | A |   | 11/2006 |
| JP | 2008225377  | A | * | 9/2008  |
| JP | 2008225377  | A |   | 9/2008  |
| JP | 2012237874  | A |   | 12/2012 |

\* cited by examiner

*Primary Examiner* — Chad Dickerson
(74) *Attorney, Agent, or Firm* — Kim & Stewart LLP

(57) ABSTRACT

According to one embodiment, an image processing apparatus includes a scanner and a control unit. The scanner reads an image formed on a sheet, generates image data at a reading resolution, then stores the image data in a storage unit at a recording resolution. The control unit combines a reading direction image with the stored image data to generate synthesized image data, then records the synthesized image data in the storage unit. The control unit determines a position and size for the reading direction image in a synthesized image corresponding to the synthesized image data based upon the reading resolution and recording resolution.

20 Claims, 10 Drawing Sheets

IMAGE PROCESSING APPARATUS AND IMAGE FORMING APPARATUS FOR SYNTHESIZING A READING DIRECTION IMAGE WITH IMAGE DATA GENERATED FROM A SCANNED SHEET TO DETERMINE READING DIRECTION OF A SHEET

CROSS-REFERENCE TO RELATED APPLICATION

This application is based upon and claims the benefit of priority from Japanese Patent Application No. 2020-110093, filed on Jun. 26, 2020, the entire contents of which are incorporated herein by reference.

FIELD

Embodiments described herein relate generally to an image processing apparatus and an image forming apparatus.

BACKGROUND

A reading direction of an original document is important information in a defect investigation of a scanned image. An image forming direction on a sheet is important information in a defect investigation of a printed image. When information relating to a sheet conveyance direction such as the reading direction and the image forming direction is missing, there is a possibility that it will take a lot of time and effort to perform the defect investigation.

DETAILED DESCRIPTION

A problem to be solved by one embodiment is to provide an image processing apparatus and an image forming apparatus capable of easily specifying a conveyance direction of a sheet.

In general, according to one embodiment, an image processing apparatus includes a scanner and a control unit. The scanner reads an image formed on a sheet and generates image data. The control unit combines a reading direction image, which indicates a reading direction in the scanner, with the image data generated by the scanner. The synthesized image data is then stored in a storage unit. The control unit determines a position and size for the reading direction image in a synthesized image corresponding to the synthesized image data based upon the reading resolution (the resolution of scanning process in the scanner) and the recording resolution (the resolution of the image data recorded in the storage unit).

According to an embodiment, it is possible to provide an image forming apparatus capable of identifying a reading direction or an image forming direction.

Figure 1:
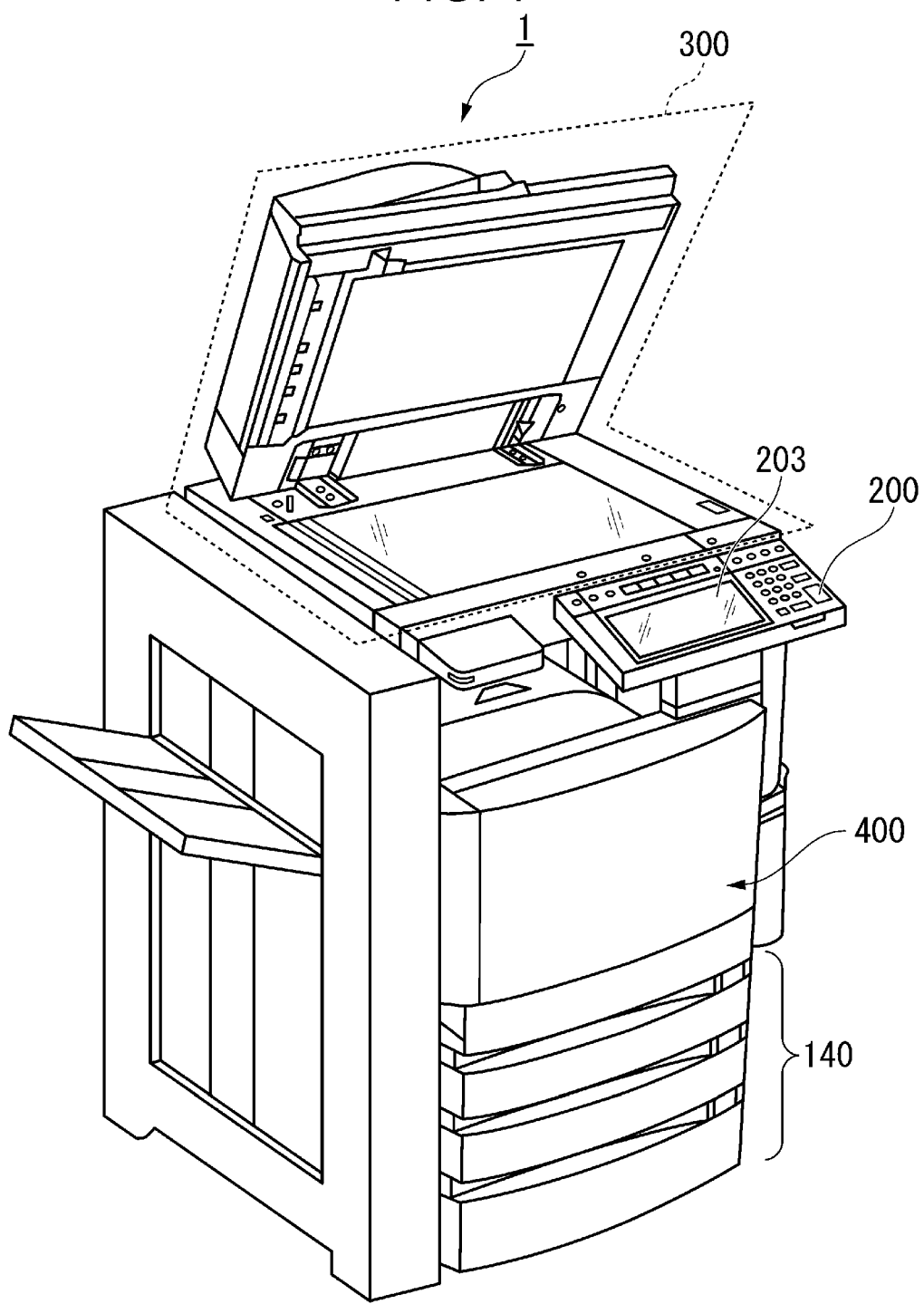
FIG. 1 is an external view of an image forming apparatus according to an embodiment.
Figure 2:
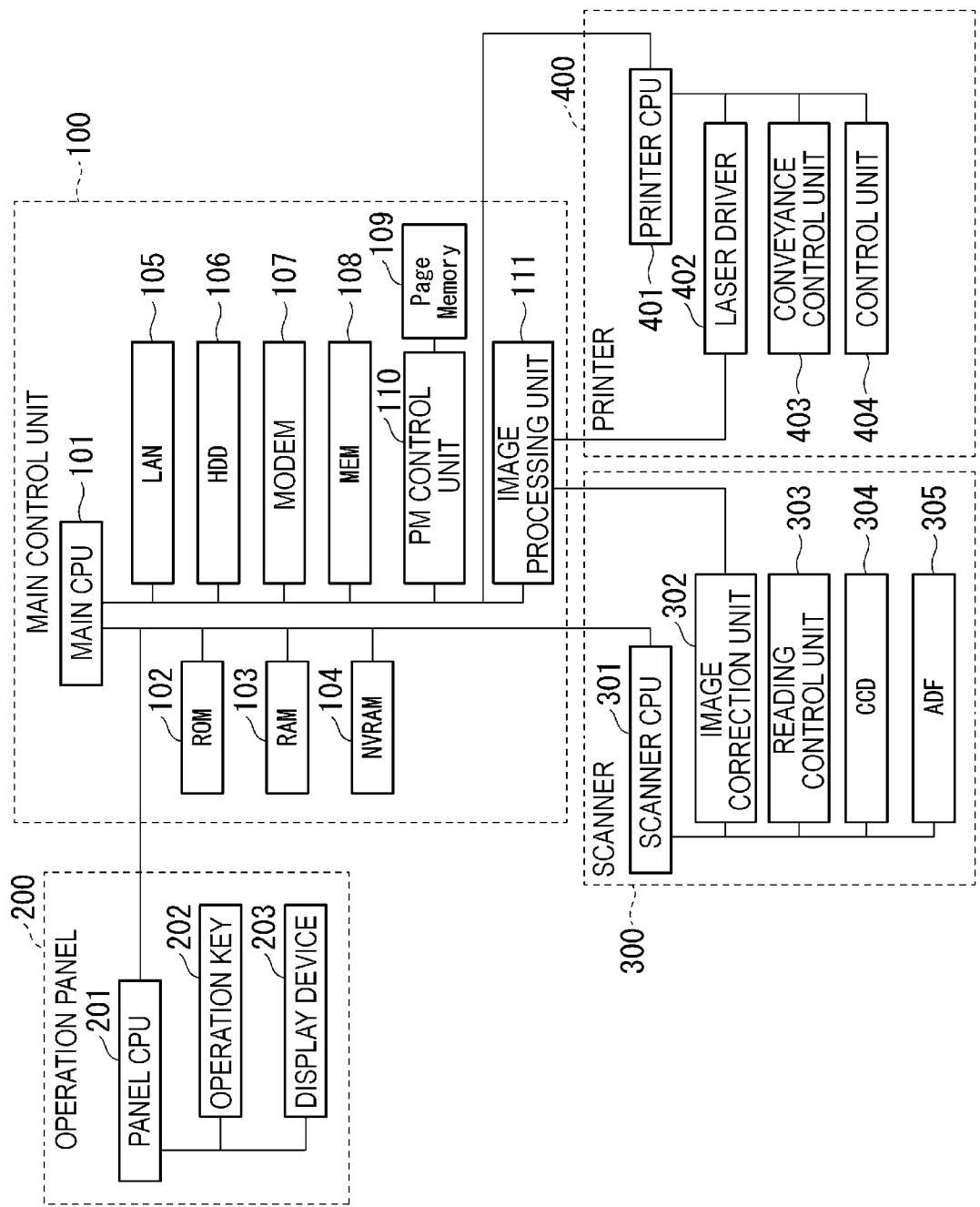
FIG. 2 is a block diagram illustrating a hardware configuration of an image forming apparatus according to an embodiment.

FIG. 1 is an external view illustrating an overall configuration example of an image forming apparatus 1 according to an embodiment. FIG. 2 is a block diagram illustrating a hardware configuration of the image forming apparatus 1. The image forming apparatus 1 is, for example, a multi-function peripheral (MFP). The image forming apparatus 1 includes a main control unit 100, a sheet storage unit 140, an operation panel 200, a scanner 300, and a printer 400. The image forming apparatus 1 forms an image on a sheet by using a developer. For example, the developer is toner. In the following description, the developer will be described as the toner. The sheet is, for example, paper and label paper. The sheet may be any material as long as the image forming apparatus 1 can form the image on a surface thereof.

The operation panel 200 includes a display device 203 and one or a plurality of operation keys 202. The operation panel 200 receives an input operation of a user. The operation panel 200 outputs a signal to the main control unit 100 in response to the input operation performed by the user.

The display device 203 is an image display apparatus such as a liquid crystal display or an organic electro luminescence (EL) display. The display device 203 displays various information related to the image forming apparatus 1.

The printer 400 forms an image on a sheet based upon image data generated by the scanner 300 or image data received via a network. The printer 400 forms an image by using the toner. The sheet on which the image is formed may be a sheet initially stored in the sheet storage unit 140 or may be a manually inserted sheet. In the following description, forming an image is also described as printing an image.

The sheet storage unit 140 stores the sheet used in the printer 400 for forming the image.

The scanner 300 reads an image based upon the brightness of reflected. The scanner 300 records the read image data. The recorded image data may be transmitted to another information processing apparatus via a network. An image corresponding to the recorded image data may be formed on a sheet by the printer 400.

In FIG. 2, the image forming apparatus 1 is shown to include the main control unit 100, the operation panel 200, the scanner 300, and the printer 400. The image forming apparatus 1 includes a main CPU 101 in the main control unit 100, a panel CPU 201 of the operation panel 200, a scanner CPU 301 of the scanner 300, and a printer CPU 401 of the printer 400.

The main control unit 100 includes the main CPU 101, a ROM 102, a RAM 103, an NVRAM. 104, a network controller 105, an HDD 106, a modem 107, a MEM 108, a page memory 109, a page memory (PM) control unit 110, and an image processing unit 111.

The main CPU 101 controls an overall operation of the image forming apparatus 1. The ROM 102 stores data necessary for controlling a control program. The RAM 103 temporarily stores data. The NVRAM 104 is a non-volatile memory.

The network controller 105 allows the image forming apparatus 1 to connect to a network. The network controller 105 may be referred to as a LAN interface or the like. The image forming apparatus 1 communicates with an external device such as a server and a personal computer (PC) via the network controller (LAN) 105. The HDD 106 stores data such as image data to be used for image formation and/or image data read by the scanner 300. The HDD 106 is an example of a storage unit. A header of the image data that has been read by the scanner 300 and stored in the HDD 106 includes information indicating reading (scanning) resolution at the time of reading and recording resolution of the image data as recorded in the HDD 106. The modem 107 allows the image forming apparatus 1 and a telephone line to be connected to each other.

The page memory 109 stores image data for each page in a plurality of pages. The page memory control unit 110 controls the page memory 109. The image processing unit 111 performs image processing on the image data. Specific examples of the image processing include color conversion processing, range correction processing, sharpness adjustment processing, gamma correction and halftone processing, and pulse width modulation (PWM) processing. The image processing unit 111 may be hardware such as an application specific integrated circuit (ASIC) or may be implemented as software.

The operation panel 200 includes the panel CPU 201, the operation key 202, and the display device 203. The panel CPU 201 controls the operation panel 200. The panel CPU 201 is connected to the main CPU 101 by a bus. Upon receiving an instruction about the display from the main CPU, the panel CPU 201 controls a screen of the display device 203 in response to the received instruction. When receiving a numerical value, instruction for processing to be executed, and/or setting information from the operation key 202, the panel CPU 201 outputs data indicating the numerical value, the processing to be executed, and the setting information to the main CPU 101. The operation key 202 is an input apparatus for inputting the processing to be executed, the setting information, and the numerical value (s). As a specific example of information received by the operation key 202, various instructions and settings such as a type (size and direction) of the sheet on which the image is formed, and scaling factor of the image formation can be performed. The display device 203 is a display apparatus such as the liquid crystal display and the organic EL display. The display device 203 may be configured as a touch panel.

The scanner 300 includes the scanner CPU 301, an image correction unit 302, a reading control unit 303, a charge coupled device (CCD) 304, and an auto document feeder (ADF) 305. The scanner CPU 301 controls the scanner 300. The image correction unit 302 includes, for example, an A/D conversion circuit, a shading correction circuit, and a line memory. The A/D conversion circuit respectively converts analog signals for R, G, and B values (RGB color channels) output from the CCD 304 into a digital signal. The ADF 305 is an automatic original document conveyance unit. The ADF 305 puts a sheet placed by the user on the ADF 305 on a conveyance path in a conveyance direction in accordance with the orientation the user placed the sheet on the ADF 305. The ADF 305 conveys the sheet by rotating a conveyance roller on the conveyance path, and the CCD 304 reads the image from the sheet as it is conveyed past the CCD 304 (or a reading position thereof).

The printer 400 includes the printer CPU 401, a laser driver 402, a conveyance control unit 403, and a control unit 404. The printer CPU 401 controls the printer 400. The laser driver 402 drives a laser to form an electrostatic latent image on a photoreceptor. The conveyance control unit 403 conveys the sheet on which the image is to be printed. The control unit 404 forms an image on the sheet conveyed by the conveyance control unit 403 by controlling an apparatus such as the laser driver 402.

Figure 3:
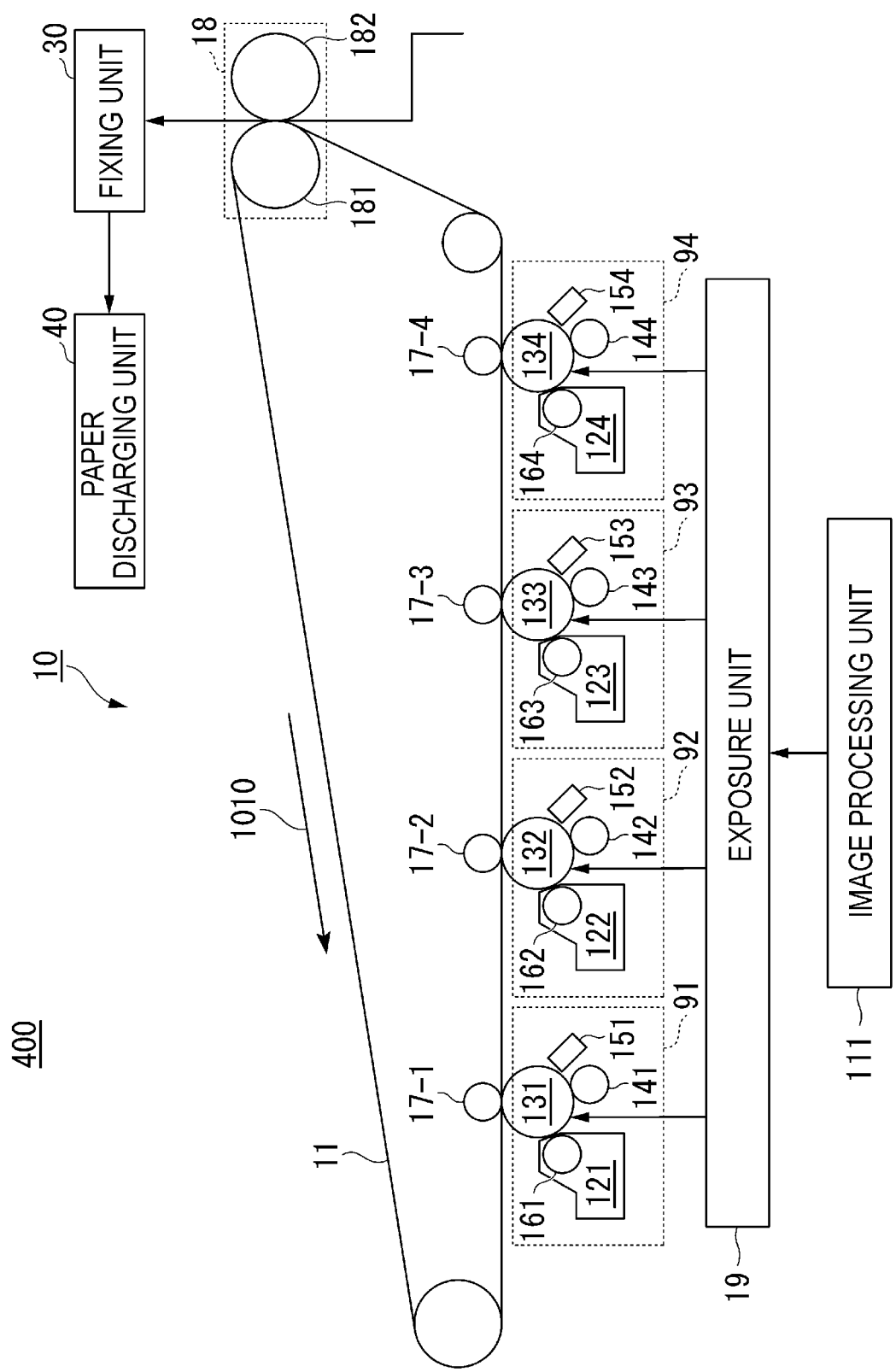
FIG. 3 is a diagram illustrating an example of an internal configuration of a printer.

FIG. 3 is a diagram illustrating an example of an internal configuration of the printer 400. In the example of FIG. 3, the printer 400 is a quadruple tandem type printer. However, the printer 400 is not limited to a quadruple tandem type.

The printer 400 includes an image forming unit 10, a fixing unit 30, and a paper discharging unit 40. The image forming unit includes an intermediate transfer body 11, developing apparatuses 91, 92, 93, 94, primary transfer rollers 17-1, 17-2, 17-3, 17-4), a secondary transfer unit 18, and an exposure unit 19.

The intermediate transfer body 11 may be a belt. The intermediate transfer body 11 is rotated by a roller in a direction of an arrow 1010. In the present description, upstream and downstream are defined based upon the direction in which the intermediate transfer body 11 moves. Visible images (e.g., toner images) generated by the developing apparatuses 91 to 94 are transferred onto a surface of the intermediate transfer body 11.

The developing apparatuses 91 to 94 form the visible images by using toner having different properties. For example, toner provided by the different developing apparatuses 91 to 94 may be different colors. For example, the toners of the different colors may be yellow (Y), magenta (M), cyan (C), and black (K). In some developing apparatuses, toner whose color disappears by external stimulation (for example, heat) may be used. Such toner may be referred to as decolorable toner in some instances. A special toner, such as glossy toner and/or a fluorescent toner may be used in some examples.

In FIG. 3, the developing apparatus 91 is positioned on a most upstream side of the four developing apparatuses, and the developing apparatus 94 is positioned on a most downstream side of the four developing apparatuses.

Even though the developing apparatuses 91 to 94 have different toner, the structural configurations thereof are the same. The developing apparatus 91 includes a developing unit 121, a photoreceptor drum 131, a charger 141, a cleaning blade 151, and a developing drum 161. The developing apparatus 92 includes a developing unit 122, a photoreceptor drum 132, a charger 142, a cleaning blade 152, and a developing drum 162. The developing apparatus 93 includes a developing unit 123, a photoreceptor drum 133, a charger 143, a cleaning blade 153, and a developing drum 163. The developing apparatus 94 includes a developing unit 124, a photoreceptor drum 134, a charger 144, a cleaning blade 154, and a developing drum 164.

Hereinafter, each developing apparatus will be described by taking the developing apparatus 91 as an example. The developing apparatus 91 includes the developing unit 121, the photoreceptor drum 131, the charger 141, the cleaning blade 151, and the developing drum 161. The developing unit 121 contains toner and a carrier. The developing unit 121 causes the developing drum 161 to attach the toner to the photoreceptor drum 131.

The photoreceptor drum 131 has a photoreceptor (photoreceptor area) on an outer peripheral surface thereof. The photoreceptor is, for example, an organic photoconductor (OPC). The photoreceptor drum 131 receives light exposure from the exposure unit 19 and an electrostatic latent image is formed on the photoreceptor.

The charger 141 uniformly charges the surface of the photoreceptor drum 131.

The cleaning blade 151 is, for example, a plate-shaped member. The cleaning blade 151 is formed of, for example, rubber such as urethane resin. The cleaning blade 151 removes the toner still adhering to the photoreceptor drum 131 after a transfer process.

Next, an outline of an operation of the developing apparatus will be described. The photoreceptor drum 131 is electrostatically charged to a predetermined potential by the charger 141. Next, the exposure unit 19 selectively irradiates the photoreceptor drum 131 with light. As a result, the potential of the area irradiated with the light on the photoreceptor drum 131 is changed from the initially charged potential. Due to this change, an electrostatic latent image is formed on the surface of the photoreceptor drum 131. The electrostatic latent image on the surface of the photoreceptor drum 131 is then developed by the toner from the developing unit 121. That is, a visible image, which is an image comprising the toner, is formed on the surface of the photoreceptor drum 131.

The primary transfer rollers 17-1 to 17-4 respectively transfer the visible images formed on the photoreceptor drum of the developing apparatuses 91 to 94 to the intermediate transfer body 11.

The secondary transfer unit 18 includes a secondary transfer roller 181 and a secondary transfer counter roller 182. The secondary transfer unit 18 collectively transfers the visible images formed on the intermediate transfer body 11 to a sheet. For example, transferring the visible image thereto by the secondary transfer unit 18 is realized by a potential difference applied between the secondary transfer roller 181 and the secondary transfer counter roller 182.

The exposure unit 19 selectively irradiates the photoreceptor drums of each of the developing apparatuses 91 to 94 with the light, thereby forming the electrostatic latent image on each drum. The exposure unit 19 includes a light source such as a laser and a light emitting diode (LED). In the present embodiment, the exposure unit 19 includes a laser and operates according to the control of the laser driver 402.

The fixing unit 30 fixes the toner image(s) to the sheet by heating and pressing the sheet with the toner image thereon. The paper discharging unit 40 then discharges the printed sheet to the outside of the image forming apparatus 1.

Next, a reading direction image indicating a reading direction and an image forming direction image indicating an image forming direction will be described. The reading direction image and the image forming direction image are images that can be used by a serviceman of the image forming apparatus to easily identify the reading direction and the image forming direction of a sheet for performance of maintenance and inspection operations. When the reading direction or image forming direction can be identified for a sheet output by an image forming apparatus, it may be possible to significantly reduce the time and labor required for investigating a defect of the image forming apparatus in comparison to a case where the reading direction or the image forming direction is not readily identifiable.

First, the reading direction image will be described. The reading direction image is an image indicating a reading direction in the scanner 300. The reading direction image may be, for example, an image indicating the reading direction in the scanner 300 according to the position. When scanning an original document, the image forming apparatus 1 combines the reading direction image indicating the reading direction in the scanner 300 with the image data. Specific description is as follows. The image processing unit 111 of the main control unit 100 combines (synthesizes) the reading direction image with the image data generated by scanning. The image processing unit 111 records the image data to which the reading direction image has been added in the HDD 106.

In this context, the reading direction in the scanner 300 refers to a sub-scanning direction of a line sensor in the scanner 300, and is the direction from the sheet edge read last by the line sensor toward the sheet edge where reading is first started by the line sensor among the four edges of the original document.

Figure 4:
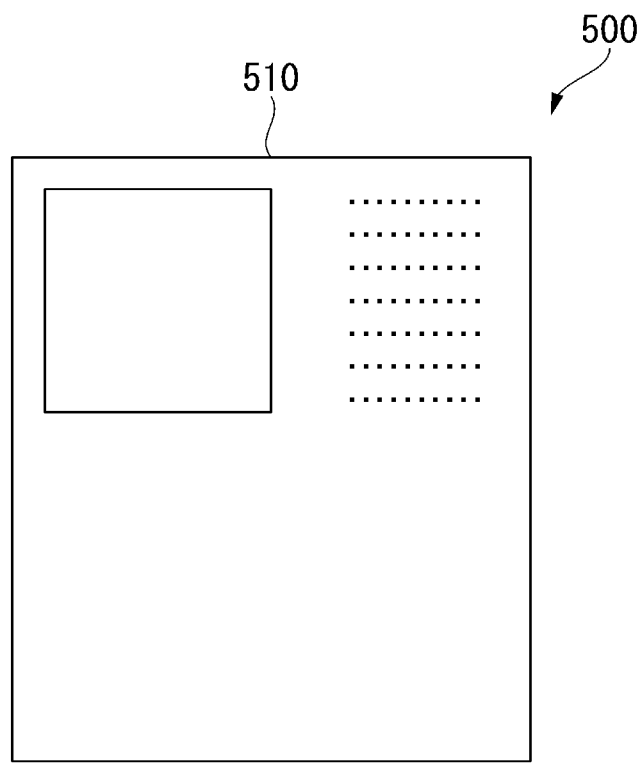
FIG. 4 is a diagram illustrating an example of an original document.

Therefore, the reading direction is uniquely determined, for example, when the edge where the reading is first started is specified. Therefore, the reading direction image in the embodiment is an image that specifies the edge where the reading was first started by the line sensor among the four edges of the original document. Details thereof will be more specifically described with reference to the drawings. FIG. 4 is a diagram illustrating an example of the original document. An original document 500 is illustrated in FIG. 4. Among four edges (sides) of the original document 500, the edge that was first read by the scanner 300 is indicated by the reference sign 510 ("first reading edge 510").

Figure 5:
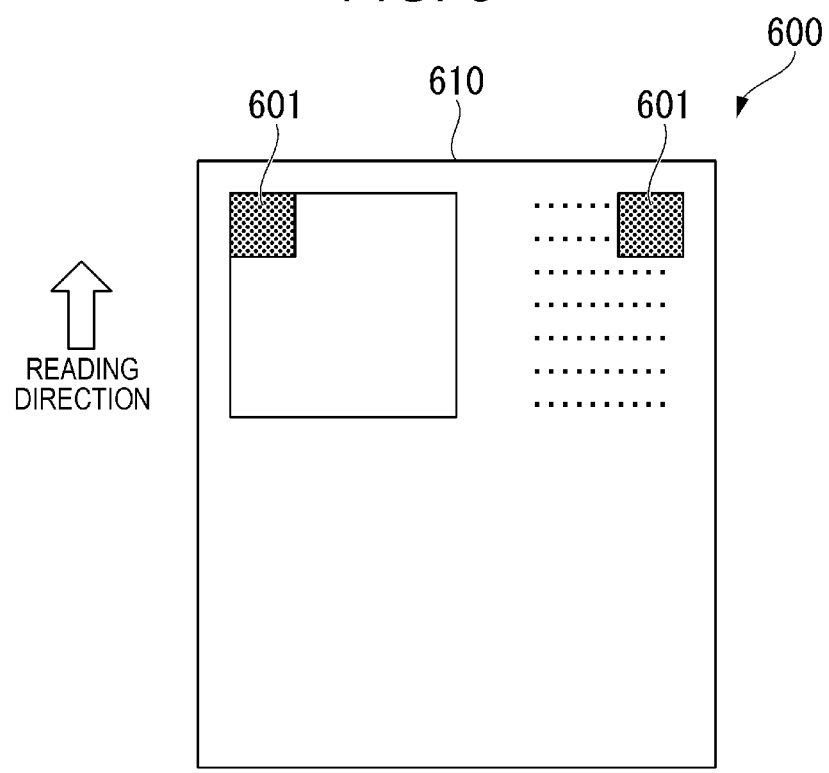
FIG. 5 is a diagram illustrating synthesized image data for which a reading direction image has been synthesized.

FIG. 5 is a diagram illustrating synthesized image data in which the reading direction image is incorporated. At least one reading direction image 601 is included in synthesized image data 600. The reading direction image 601 is configured by using one or a plurality of symbols. In the example of FIG. 5, two symbols are arranged aligned in a direction perpendicular to the reading direction. The symbols used in FIG. 5 are two rectangles, more specifically squares. In general, the specific shape and configuration of the reading direction image (s) 601 are not limited as long as the reading direction can be distinguished. In the synthesized image data 600, the edge corresponding to the edge 510 of the original document 500 is edge 610. The edge 610 can be identified by reference to the reading direction image 601 formed by a combination of the two aligned symbols. Accordingly, the reading direction is easily specified by a serviceman or the like.

The image data may be recorded in the HDD 106 at a resolution different from the resolution when the original document was read. For example, the resolution when the original document was read may be 600 dpi, and the resolution of the image data recorded in the HDD 106 may be 300 dpi. At this time, when the reading direction images are synthesized as they are, apart of the reading direction image may be missing.

Figure 6:
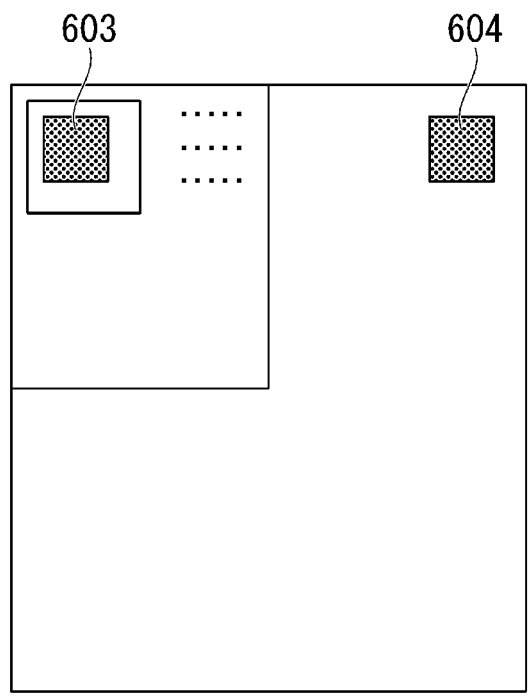
FIG. 6 is a diagram illustrating a missing reading direction image example.

FIG. 6 is a diagram illustrating a missing example of the reading direction image. Since the resolution becomes smaller, the image data recorded in the HDD 106 also becomes a smaller image. Therefore, as illustrated in FIG. 6, while one symbol 603 forming the reading direction image is added to the image data, the other symbol 604 would be missing from the synthesized image data.

Therefore, the image processing unit 111 determines a position where the reading direction image is arranged and a size of the reading direction image based upon reading resolution and recording resolution so that the part of the reading direction image is not missing. Correction of the synthesis position and correction of the size of the reading direction image are collectively referred to as reading direction image correction processing. Hereinafter, an example of the reading direction image correction processing will be described.

First, coordinates of the synthesis position of respective symbols of the reading direction image when the reading resolution and the recording resolution are the same are respectively set to (XPOS1, YPOS1) and (XPOS2, YPOS2). The reading resolution is set to IN_DPI and the recording resolution is set to OUT_DPI. A correction coefficient K is set to OUT_DPI/IN_DPI. Lengths in a horizontal direction and a vertical direction of the reading direction image when the reading resolution and the recording resolution are the same are respectively set to XSIZE and YSIZE.

At this time, the image processing unit 111 derives (K×XPOS1, K×YPOS1) and (K×XPOS2, K×YPOS2) as the coordinates of a corrected synthesis position. The image processing unit 111 respectively derives K×XSIZE and K×YSIZE as a corrected length in the horizontal direction and the vertical direction of the reading direction image. For example, when IN_DPI is 600 dpi and OUT_DPI is 300 dpi, the correction coefficient becomes 0.5, such that the reading direction image becomes a symbol whose vertical and horizontal sizes are respectively half.

Figure 7:
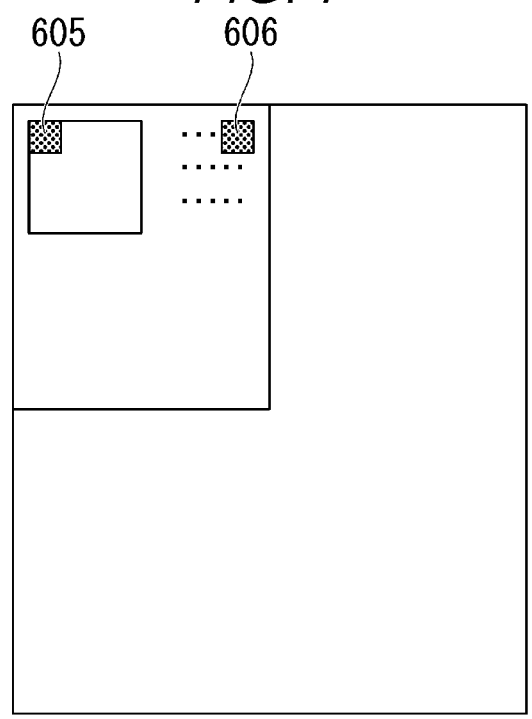
FIG. 7 is a diagram illustrating an example of synthesis after correction.

FIG. 7 is a diagram illustrating a synthesis example of after correction. As illustrated in FIG. 7, neither the symbols 605 nor the symbols 606 of the reading direction image are missing (outside the page region corresponding to original document 500), and the size the symbols 605 and 606 is also corrected. By doing so, the reading direction can be identified even when the reading resolution and the recording resolution are different from each other. When the image data is printed, the image data is printed by returning to the reading resolution and thus the size of the reading direction image can be restored to an original size, such that the reading direction image can be kept at a constant size.

Next, the reading direction image at the time of copying will be described. In copying, an original document is first read, then scaled (enlarged or reduced) according to a designated scaling factor, and finally printed on a sheet of a designated size. When the position and size of the reading direction image change according to the scaling, there is a possibility that a serviceman cannot determine whether the image printed on the sheet is an image originally existing on the original document or the reading direction image. Whether or not the scaling is to be performed and the scaling factor when the scaling is performed are recorded in the RAM 103. The image processing unit 111 determines whether or not to perform the scaling by referring to the RAM 103.

Here, even when the image is scaled and then printed on the sheet, the image processing unit 111 synthesizes the reading direction image with the image data without changing the position where the reading direction image is placed and the size of the reading direction image.

Figure 8:
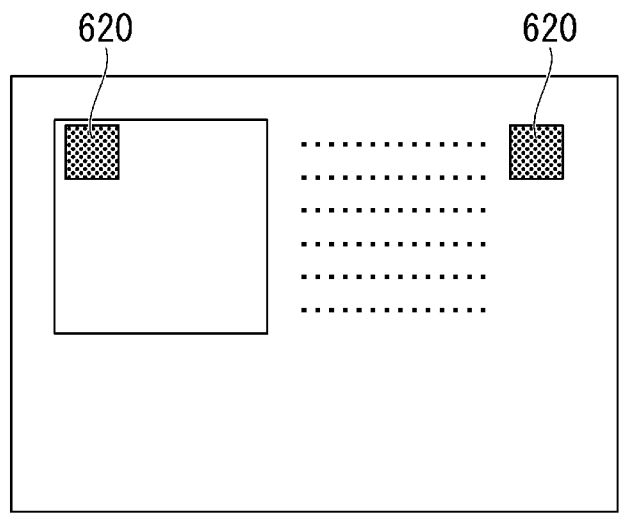
FIG. 8 is a diagram illustrating an example of a sheet on which an image is printed at the same size.
Figure 9:
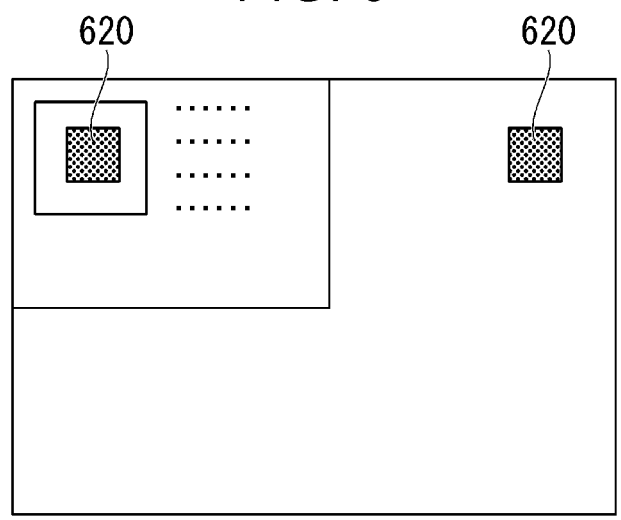
FIG. 9 is a diagram illustrating an example of a sheet on which an image is reduced and printed.
Figure 10:
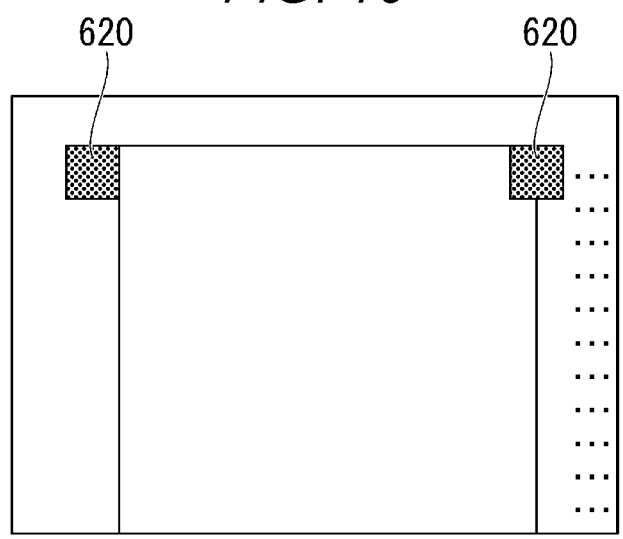
FIG. 10 is a diagram illustrating an example of a sheet on which an image is enlarged and printed.

FIG. 8 is a diagram illustrating an example of a sheet on which an image is printed at the same size. FIG. 9 is a diagram illustrating an example of a sheet on which an image is reduced and printed. FIG. 10 is a diagram illustrating an example of a sheet on which an image is enlarged and printed.

In each of FIGS. 8, 9, and 10, it is shown that printing is performed without changing a position where each symbol 620 of the reading direction image is placed and a size of each symbol 620 of the reading direction image is maintained. In this manner, the serviceman can determine whether the image printed on the sheet is the image originally existing on the original document or the reading direction image.

Next, synthesizing the image forming direction image indicating the image forming direction with the image data will be described. In this context, the image forming direction is a conveyance direction of a sheet passing through the secondary transfer unit 18.

The image forming direction is uniquely determined when an edge first passing through the secondary transfer unit 18 (leading edge) is specified. Here, the image forming direction image in the embodiment is an image that specifies the sheet edge first passing through the secondary transfer unit 18 from among the four edges of the sheet. The conveyance direction of the sheet is generally set by an orientation of the sheet in the sheet storage unit 140. Therefore, the image processing unit 111 generates image data in which the image forming direction image is placed according to the orientation of the sheet in the sheet storage unit 140. The orientation of the sheet is recorded in the RAM 103 for each cassette of the sheet storage unit 140. The image processing unit 111 records the synthesized image data in the HDD 106. The image data recorded in the HDD 106 is output to the printer 400.

Figure 11:
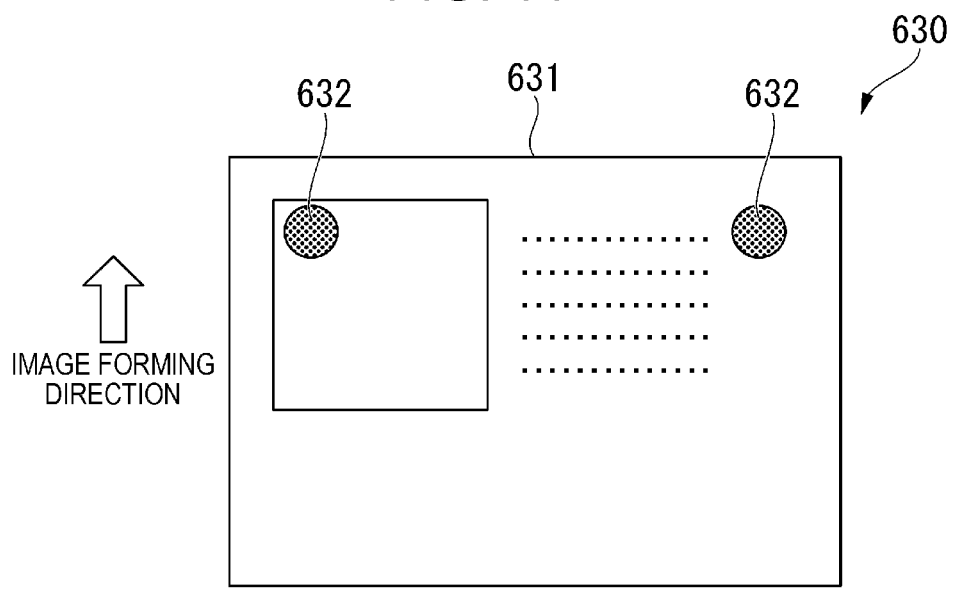
FIG. 11 is a diagram illustrating an example of a printed sheet on which an image forming direction image is indicated.

FIG. 11 is a diagram illustrating an example of a printed sheet on which the image forming direction image has been printed. A printed sheet 630 is illustrated in FIG. 11. Among four edges of the printed sheet 630, the leading edge is edge 631. The edge 631 is identifiable by two symbols 632 forming the image forming direction image. Accordingly, the image forming direction is easily specified.

As illustrated in FIG. 11, the image forming direction image 632 has a circular shape. That is, the reading direction image and the image forming direction image have different symbol types for identification purposes. In the case of FIG. 11, a shape is different, but, in other examples, a size, a color, a density, and/or a fill pattern may be different instead or in addition a shape. Even when the image is scaled and printed on the sheet, the image processing unit 111 synthesizes the image forming direction image with the image data without changing the size of the image forming direction image. Accordingly, the serviceman can determine whether the image printed on the sheet is the image originally existing on the original document or the image forming direction image.

Figure 12:
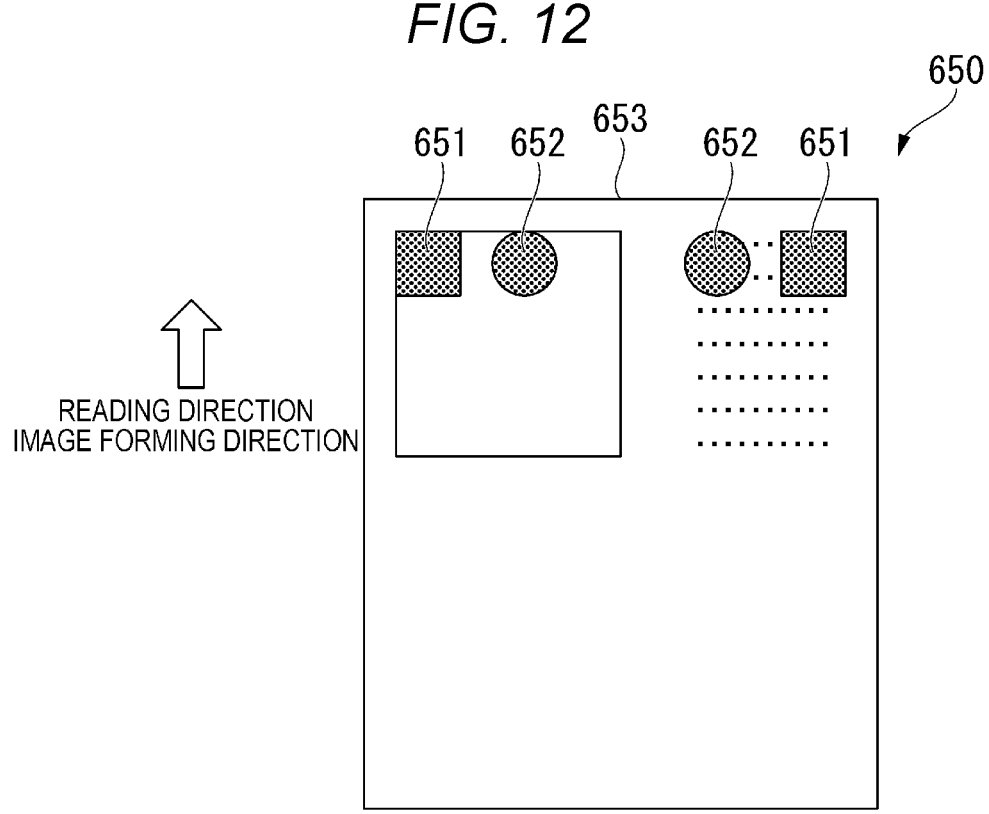
FIG. 12 is a diagram illustrating an example of a sheet on which the image forming direction image and the reading direction image are indicated.
Figure 13:
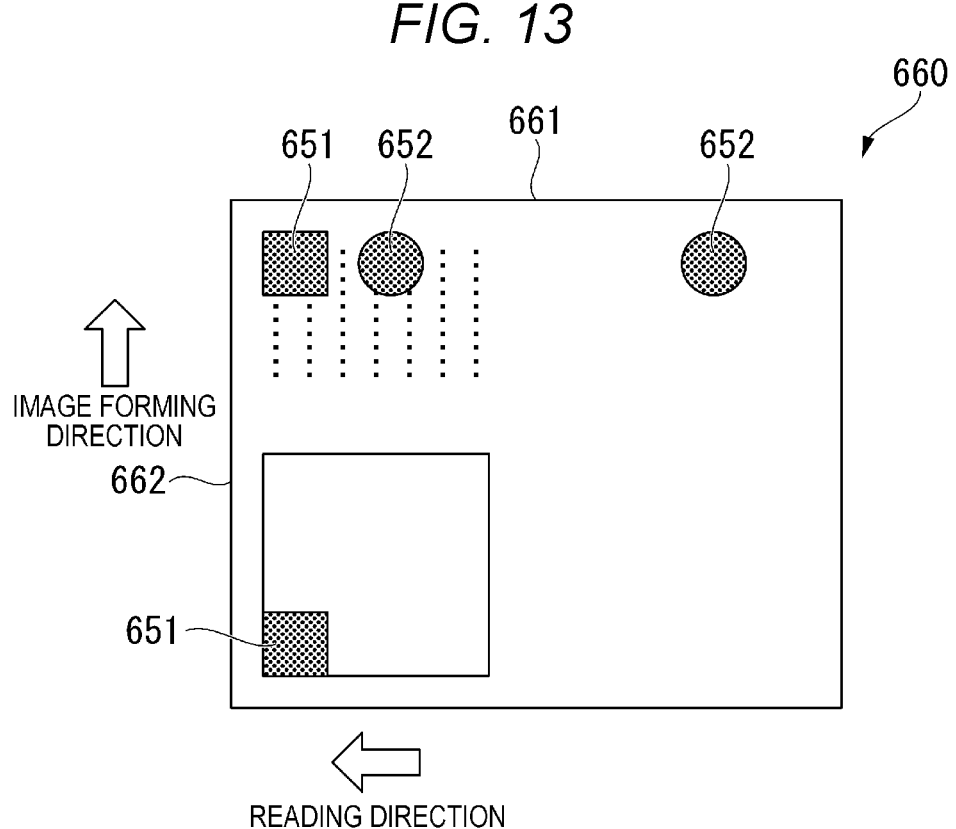
FIG. 13 is a diagram illustrating an example of a sheet.

The image forming apparatus 1 can also perform printing by adding both the image forming direction image and the reading direction image to the original document image data. FIGS. 12 and 13 are diagrams illustrating an example of a sheet on which the image forming direction image and the reading direction image are printed. In the examples illustrated in FIGS. 12 and 13, a size of each sheet is A4. In the examples illustrated in FIGS. 12 and 13, the reading direction is a positive direction of A4. The positive direction of A4 here is a direction perpendicular to a short side of A4.

In the examples illustrated in FIGS. 12 and 13, a direction of the sheet in the sheet storage unit 140 is different by 90°. Specifically, a direction of the sheet in the example illustrated in FIG. 12 is a direction in which a conveyance direction of the sheet becomes the positive direction of A4. A direction of the sheet in the example illustrated in FIG. 13 is a direction (A4-R) in which the conveyance direction of the sheet is perpendicular to the positive direction of A4.

Accordingly, in the example illustrated in FIG. 12, since the reading direction and the image forming direction match, a reading direction image 651 and an image forming direction image 652 are placed so as to indicate the same direction. On the other hand, in the example illustrated in FIG. 13, since the reading direction and the image forming direction are a different direction, the reading direction image 651 and the image forming direction image 652 are placed so as to indicate the different directions. Accordingly, since it is possible to easily identify the reading direction and the printing direction, the serviceman can significantly reduce the time and labor required for investigating a defect.

As illustrated in FIGS. 12 and 13, the reading direction image 651 and the image forming direction image 652 are synthesized so as not to overlap each other. For example, two patterns of the synthesis position of the image forming direction image are prepared. One of the two patterns is configured to indicate a position when only the image forming direction image is being added. The other one is configured to be at a position where the image forming direction image does not overlap the reading direction image when the reading direction image and the image forming direction image are both added at the same time. Accordingly, the image processing unit 111 can synthesize the reading direction image and the image forming direction image so as not to overlap each other.

Figure 14:
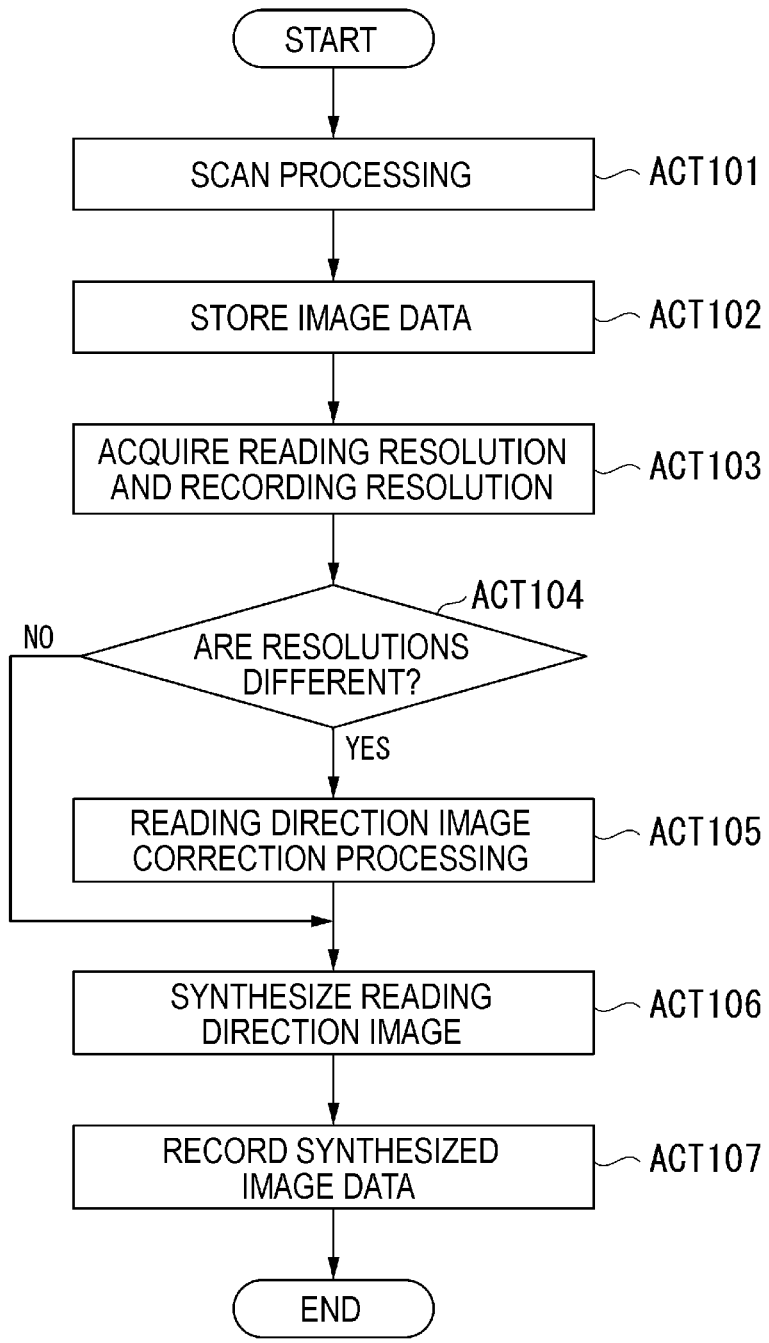
FIG. 14 is a flowchart illustrating processing for synthesizing a reading image.

FIG. 14 is a flowchart illustrating processing for synthesizing a reading image. The scanner 300 performs scan processing (ACT 101). Image data obtained by the scan processing is recorded in the page memory 109. The image processing unit 111 performs image processing on the image data recorded in the page memory 109, and records the image data in the HDD 106 (ACT 102).

The image processing unit 111 acquires reading resolution and recording resolution from the image data recorded in the HDD 106 (ACT 103). The image processing unit 111 determines whether or not the acquired reading resolution and recording resolution are different from each other (ACT 104). When the reading resolution and the recording resolution are equal to each other (ACT 104; NO), the image processing unit 111 proceeds to ACT 106. When the reading resolution and the recording resolution are different from each other (ACT 104; YES), the image processing unit 111 performs the above-described reading direction image correction processing (ACT 105).

The image processing unit 111 synthesizes the reading direction image (ACT 106). If the reading direction image correction processing was performed, the image processing unit 111 synthesizes the reading direction image with a position and a size derived by the reading direction image correction processing. When the reading resolution and the recording resolution are equal to each other, the image processing unit 111 synthesizes the reading direction image at a position and a size in accordance with the reading resolution. The image processing unit 111 records the synthesized image data in the HDD 106 (ACT 107) and ends the processing.

Figure 15:
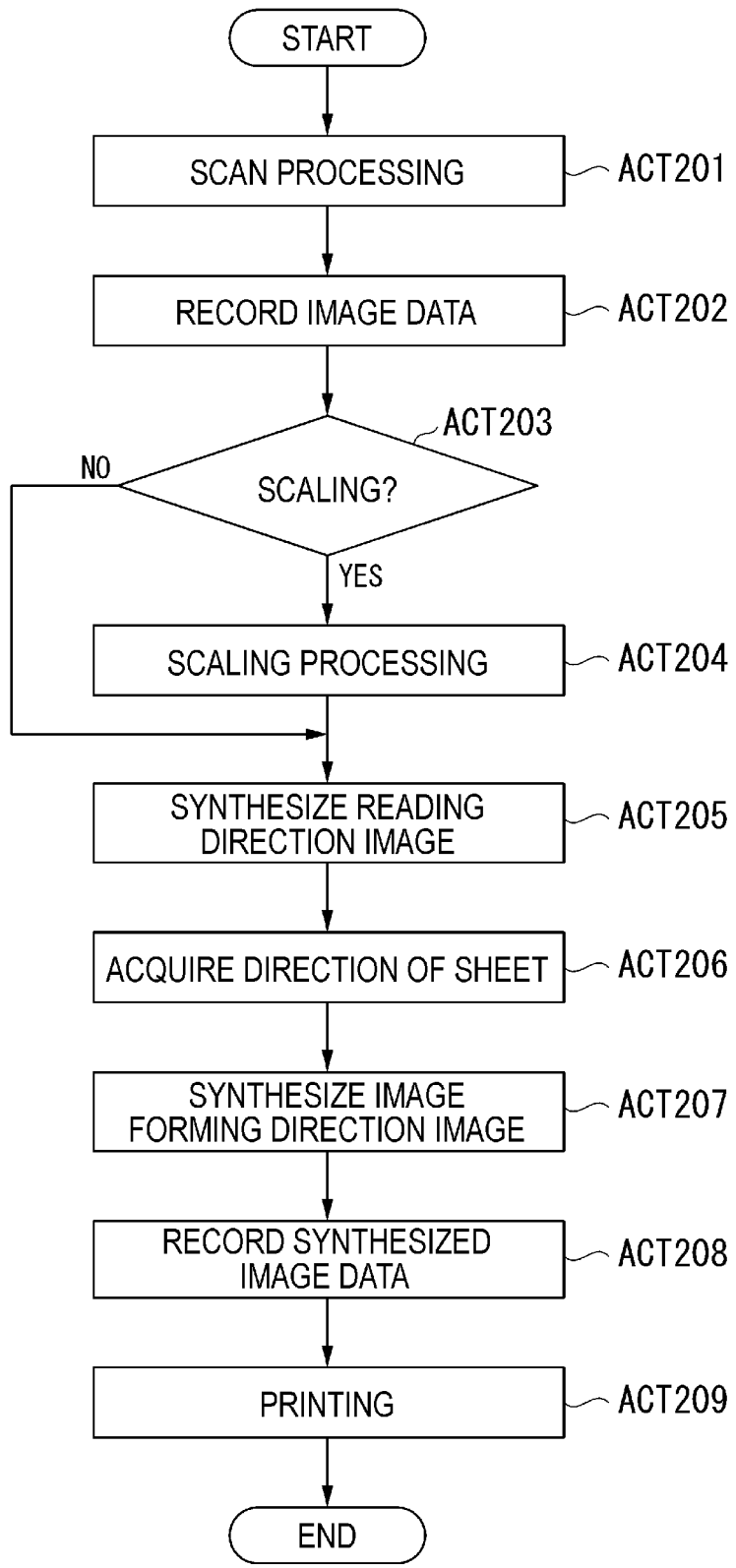
FIG. 15 is a flowchart illustrating processing for synthesizing a reading direction image and an image forming direction in copying.

FIG. 15 is a flowchart illustrating processing for synthesizing the reading direction image and the image forming direction for a copying operation (a copier function). The scanner 300 performs scan processing (ACT 201). Image data obtained by the scan processing is recorded in the page memory 109. The image processing unit 111 performs image processing on the image data recorded in the page memory 109, and records the image data in the HDD 106 (ACT 202).

The image processing unit 111 determines whether or not to perform the copying with scaling of an image (ACT 203). When the copying is not performed with scaling of the image (ACT 203; NO), the image processing unit 111 proceeds to ACT 205. When the copying is performed with scaling (ACT 203; YES), the image processing unit 111 performs scaling processing (ACT 204). A scaling factor for the scaling processing is recorded in the RAM 103 as described above. The image processing unit 111 next synthesizes the reading direction image (ACT 205).

The image processing unit 111 acquires a direction of a sheet on which the image is formed in the sheet storage unit 140 (ACT 206). The image processing unit 111 synthesizes the image forming direction image according to the acquired direction thereof (ACT 207). The image processing unit 111 records the synthesized image data in the HDD 106 (ACT 208). The image processing unit 111 converts the image data recorded in the HDD 106 into image data for printing (for example, raster data), and outputs the converted image data to the printer 400. The printer 400 performs printing by using the inputted image data (ACT 209), and ends the processing.

In the embodiment described above, a plurality of reading direction images in different operation modes may be provided. For example, reading direction images in a different mode may be synthesized so that image data obtained from an original document placed on a platen glass and image data obtained from the ADF 305 can be distinguished from one another. When the ADF 305 can read both sides of the original document, reading direction images in a different mode may be synthesized so that image data obtained from a front surface and image data obtained from a back surface can be distinguished.

The main CPU 101 and the image processing unit 111 may be on the same processor.

An embodiment may be configured as an image processing apparatus that does not include the printer 400.

According to the image forming apparatus 1 of an embodiment, it is possible to provide an image forming apparatus for which a reading direction can be readily identified.

Various functions and operations described for an image forming apparatus according to an embodiment may be realized by a computer. In that case, a program for realizing these functions and/or operations can be recorded in a non-volatile computer-readable recording medium, and a computer system can read and execute the program recorded in the recording medium, thereby realizing the functions/operations. A "computer system" in this context includes an operation system (OS) and hardware such as a peripheral device. A "computer-readable recording medium" refers to a portable medium such as a flexible disk, a magneto-optical disk, a ROM, and a CD-ROM, and a storage apparatus such as a hard disk built in the computer system. A storage apparatus in this context may include cloud-based storage solutions. The program may be designed to realize a part of the above-described functions, and the above-described functions may be realized in combination with the program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a scanner configured to read an image from a sheet to generate image data at a reading resolution and then store the image data in a storage unit at a recording resolution; and
a control unit configured to combine a reading direction image with the stored image data to generate synthesized image data and then record the synthesized image data in the storage unit, wherein the control unit is further configured to determine a position and size for the reading direction image in a synthesized image corresponding to the synthesized image data based upon the reading resolution of the generated image data and the recording resolution of the stored image data.

2. The image processing apparatus according to claim 1, the reading direction image consists of two identical marks aligned with each other in a direction perpendicular to a reading direction.

3. The image processing apparatus according to claim 2, wherein the two identical marks are rectangles.

4. The image processing apparatus according to claim 1, wherein the reading direction image comprises two identical marks aligned with each other in a direction perpendicular to a reading direction.

5. The image processing apparatus according to claim 1, wherein a reading direction is a sub-scanning direction for a line sensor in the scanner.

6. The image processing apparatus according to claim 1, wherein a reading direction is a sub-scanning direction for the scanner.

7. The image processing apparatus according to claim 1, wherein the control unit is further configured to generate the reading direction image to be combined with the stored image data to generate the synthesized image data.

8. The image processing apparatus according to claim 1, further comprising:
a printer configured to print an image of a sheet, the image corresponding to the generated synthesized image data.

9. The image processing apparatus according to claim 8, wherein the control unit is further configured to include an image forming direction image for the printer in the synthesized image data.

10. The image processing apparatus according to claim 9, wherein the control unit is configured to keep the print size of the image forming direction image the same even when the image data is scaled to different sizes.

11. The image processing apparatus according to claim 9, wherein the image forming direction image comprises two marks aligned perpendicular to a sheet conveyance direction through the printer.

12. The image processing apparatus according to claim 11, wherein the two marks of the image forming direction image are visually distinct from marks of the reading direction image.

13. The image processing apparatus according to claim 1, wherein the reading resolution and the recording resolution are different.

14. An image forming apparatus, comprising:
a scanner configured to read an image from a sheet to generate image data at a reading resolution and then store the image data in a storage unit at a recording resolution; and
a printer configured to print images on sheets according to image data; and
a control unit configured to combine the stored image data with an image forming direction image and a reading direction image to generate synthesized image data and then record the synthesized image data in a storage unit, wherein
the control unit is further configured to:
determine a position and size for the reading direction image in a synthesized image corresponding to the synthesized image data based upon the reading resolution of the generated image data and the recording resolution of the stored image data, and
determine a position and size for the image forming direction image in the synthesized image based on a sheet storage location to be used by the printer in the printing of the synthesized image on a sheet.

15. The image forming apparatus according to claim 14, the reading direction image consists of two identical marks aligned with each other in a direction perpendicular to a reading direction.

16. The image forming apparatus according to claim 15, wherein the two identical marks are rectangles.

17. The image forming apparatus according to claim 14, wherein the reading direction image comprises two identical marks aligned with each other in a direction perpendicular to a reading direction.

18. The image forming apparatus according to claim 14, wherein a reading direction is a sub-scanning direction for a line sensor in the scanner.

19. The image forming apparatus according to claim 14, wherein a reading direction is a sub-scanning direction for the scanner.

20. The image forming apparatus according to claim 14, wherein the control unit is further configured to:
generate the reading direction image to be combined with the stored image data to generate the synthesized image data, and
generate the image forming direction to be combined with the stored image data to generate the synthesized image data.

* * * * *

UNITED STATES PATENT AND TRADEMARK OFFICE
CERTIFICATE OF CORRECTION

| | |
|---|---|
| PATENT NO. | : 11,323,589 B2 |
| APPLICATION NO. | : 17/202689 |
| DATED | : May 3, 2022 |
| INVENTOR(S) | : Yoshihito Hiroe |

It is certified that error appears in the above-identified patent and that said Letters Patent is hereby corrected as shown below:

In the Claims

In Column 12, Claim 18, Line 39, please replace "fora" with "for a".

Signed and Sealed this
Twenty-second Day of November, 2022

Katherine Kelly Vidal
*Director of the United States Patent and Trademark Office*